United States Patent
Dierke et al.

(12)

(10) Patent No.: US 6,301,598 B1
(45) Date of Patent: Oct. 9, 2001

(54) METHOD AND APPARATUS FOR ESTIMATING A SQUARE OF A NUMBER

(75) Inventors: Gregg Dierke; Darren D. Neuman, both of San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/207,704

(22) Filed: Dec. 9, 1998

(51) Int. Cl.$^7$ ..................................................... G06F 7/38
(52) U.S. Cl. ............................................................. 708/606
(58) Field of Search ..................... 708/606, 503, 708/200

(56) References Cited

U.S. PATENT DOCUMENTS

| | | | |
|---|---|---|---|
| 3,610,906 | * 10/1971 | Stampler | 708/606 |
| 5,337,267 | * 8/1994 | Colavin | 708/606 |
| 5,394,350 | * 2/1995 | Gong et al. | 708/606 |
| 5,629,885 | * 5/1997 | Pirson et al. | 708/606 |
| 6,018,758 | * 1/2000 | Griesbach et al. | 708/606 |
| 6,032,169 | * 2/2000 | Malzahn et al. | 708/606 |

* cited by examiner

*Primary Examiner*—Tan V. Mai

(57) ABSTRACT

A square estimator computes an estimate of the square of an input number. The input number preferably is provided to combinational logic that logically manipulates the bits of the input number to generate an estimate of the square of the input number. The level of accuracy of the square generator can be programmed or predetermined by including or enabling various term generator logic units. Each term generator logic unit produces an output value that, when added to all of the other output values from the other term generators, provides an estimate of the square of the input number. Additionally, negative correction logic can also be incorporated into the square estimator for producing a negative correction value that when added to the estimate values from the various term generators, permits the square estimator to estimate the square of negative numbers as well as positive numbers.

28 Claims, 13 Drawing Sheets

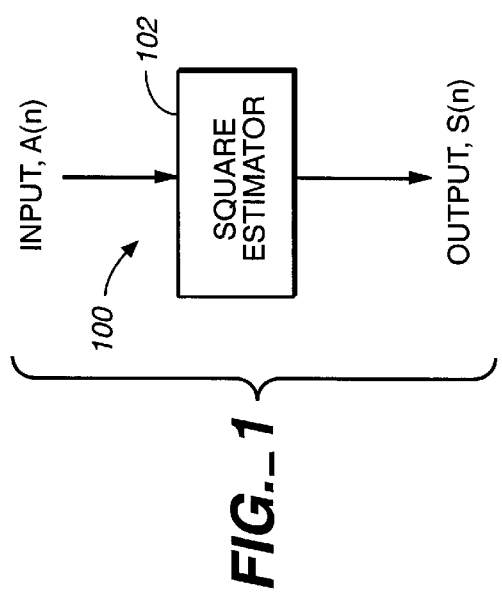
FIG._1
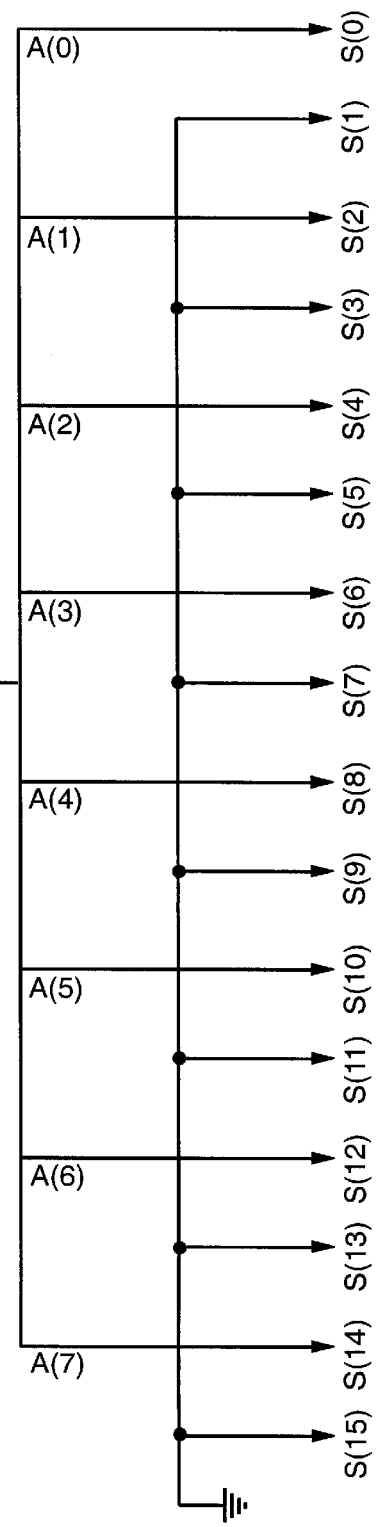
FIG._2

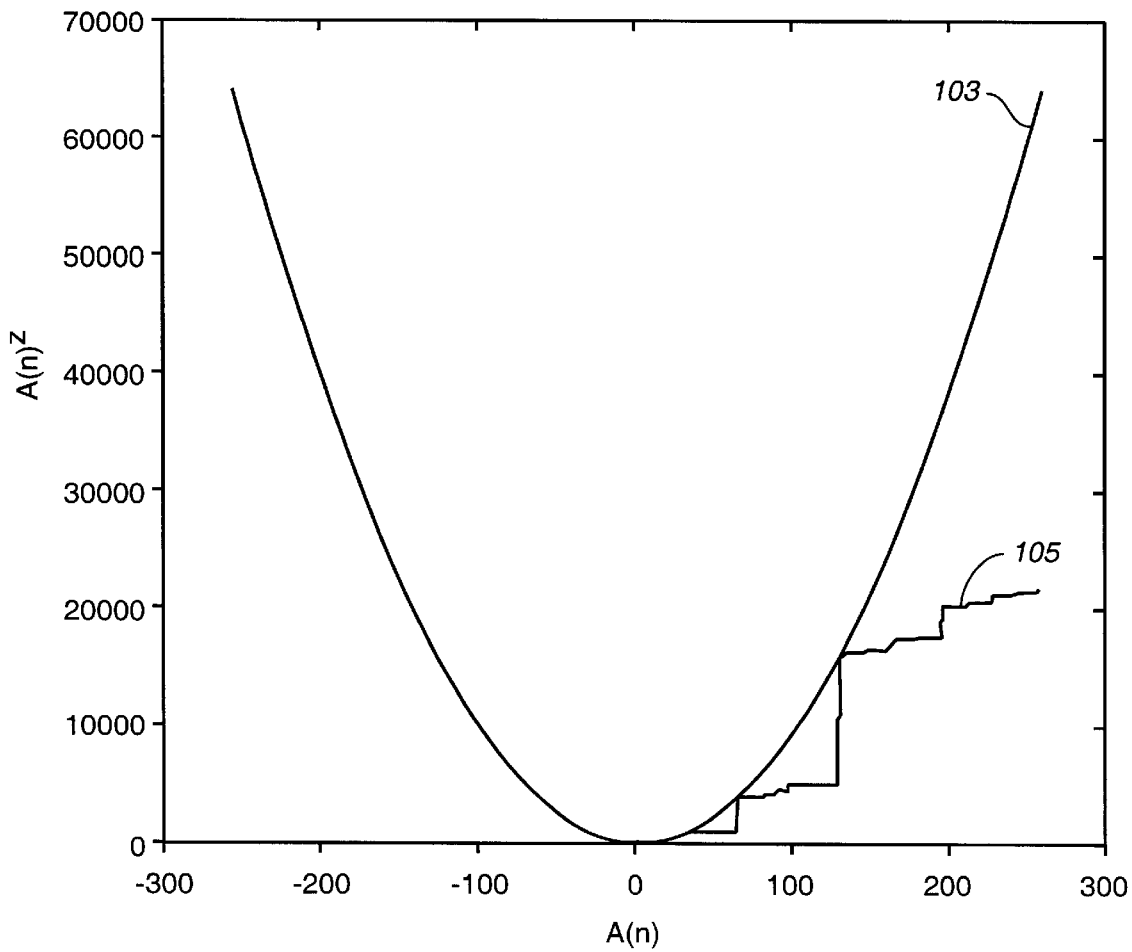
FIG._3

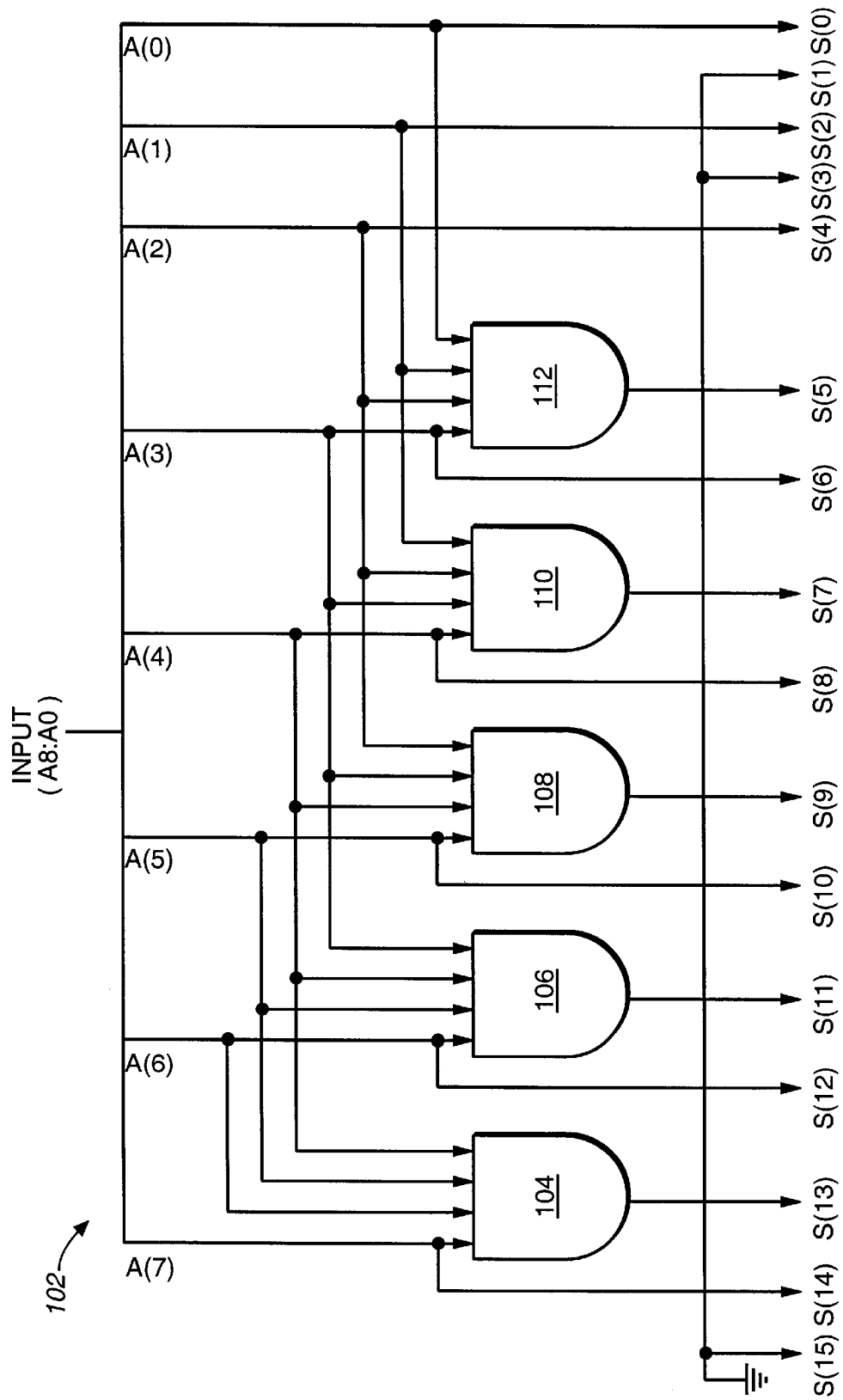
FIG._4

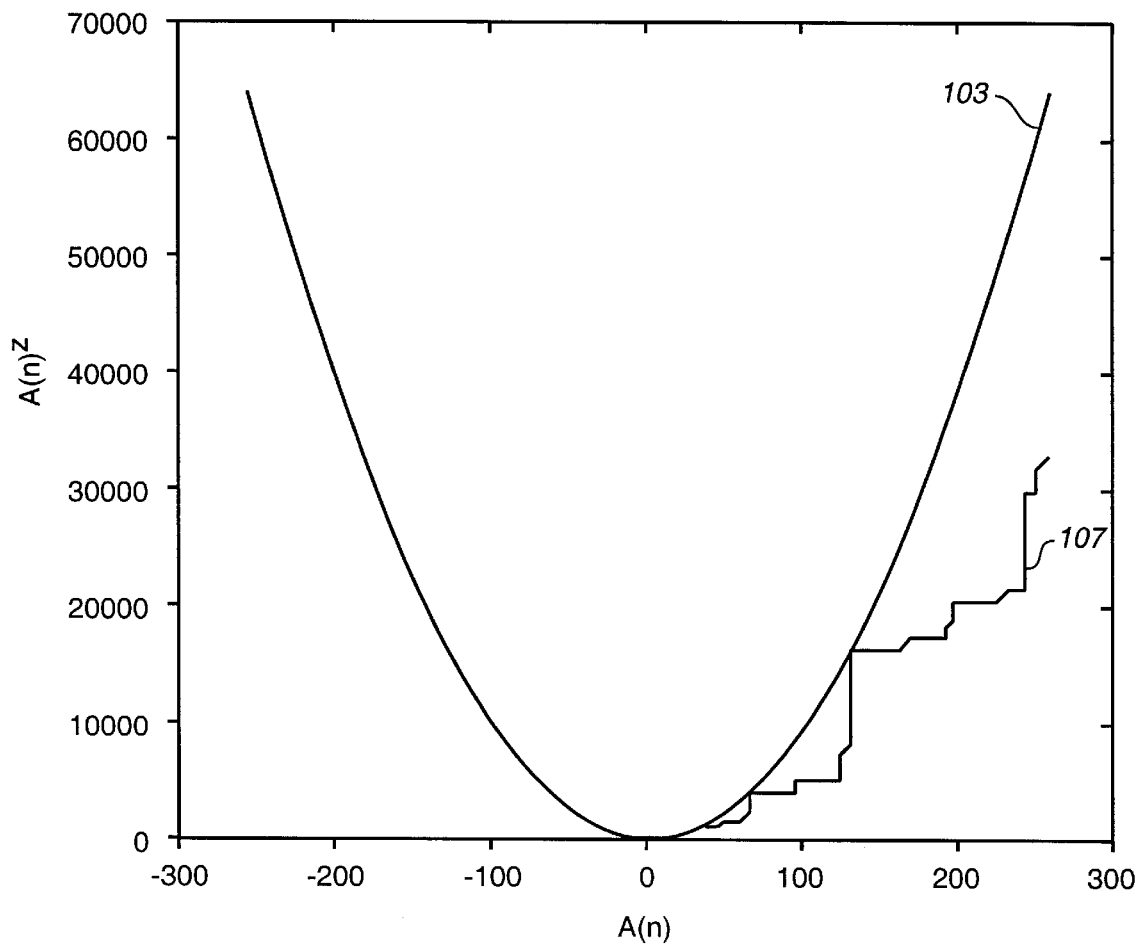
FIG._5

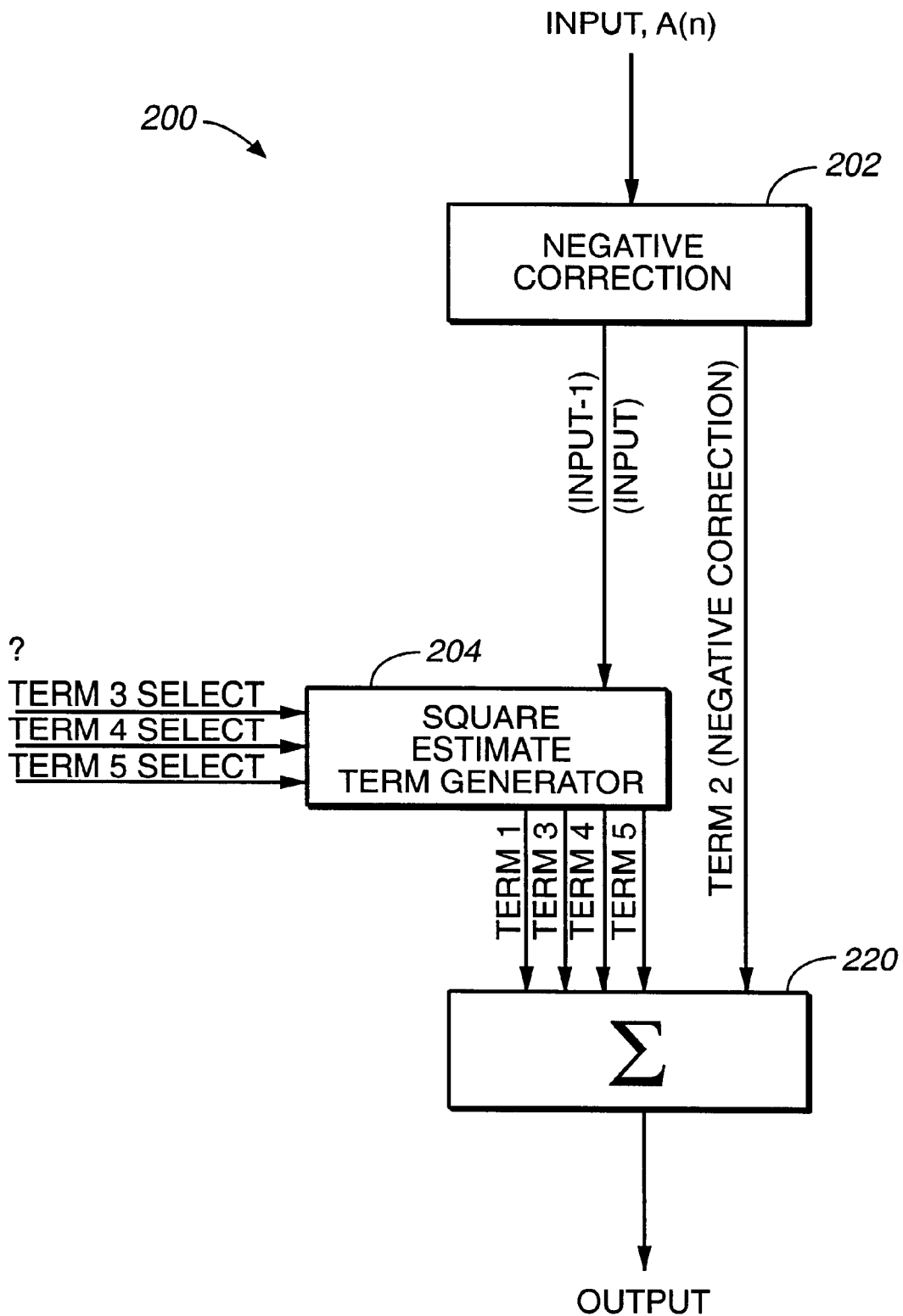
FIG._6

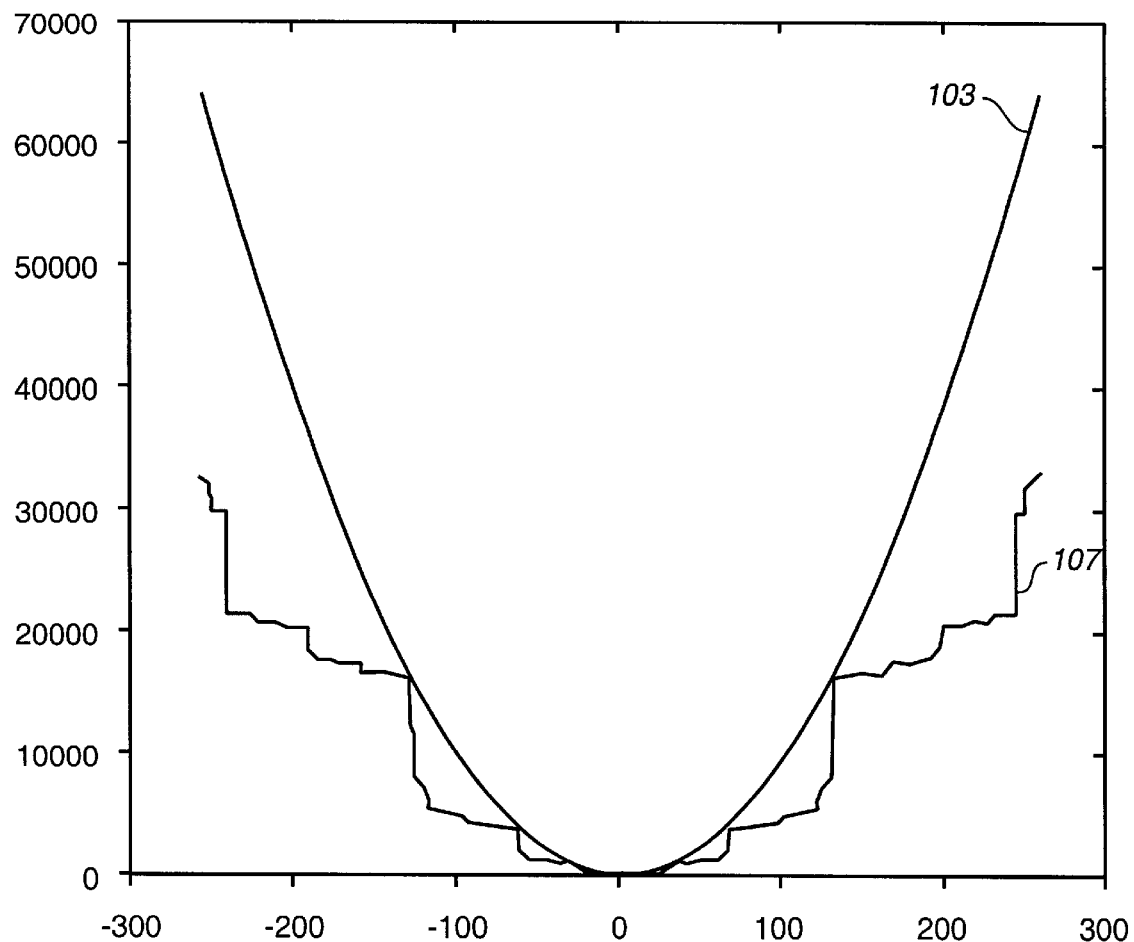
FIG._7

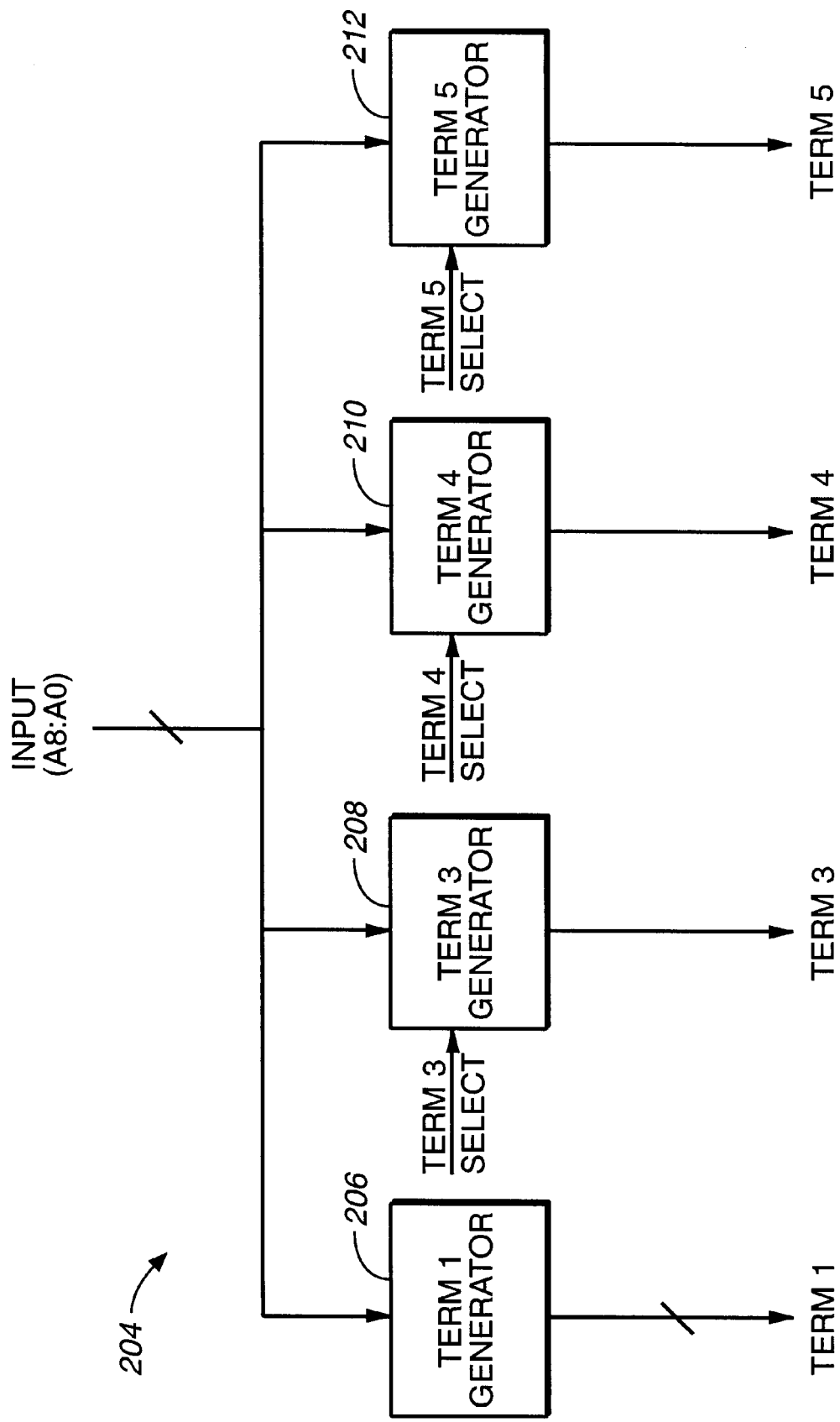
FIG._8

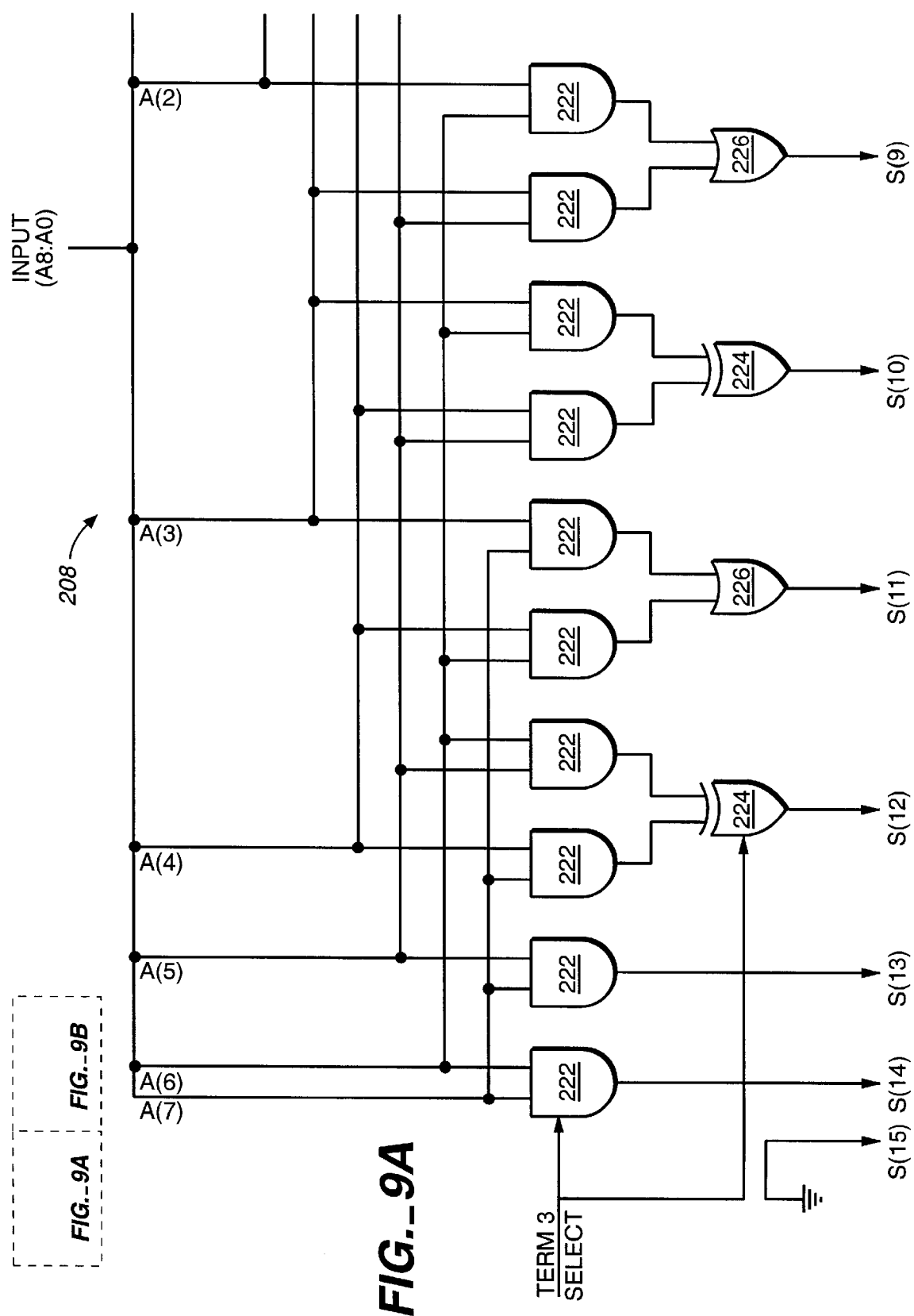
FIG._9A

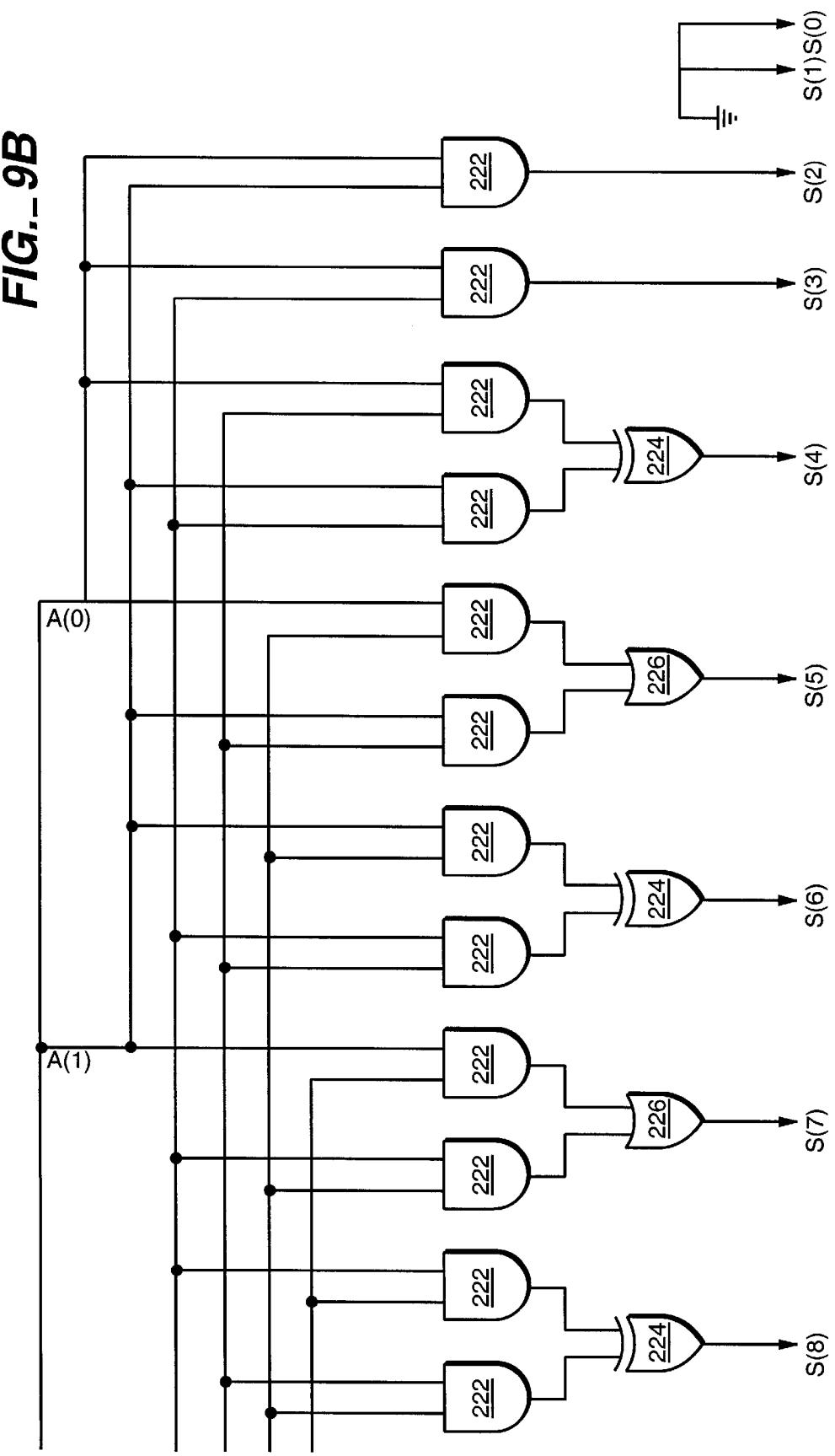
FIG._9B

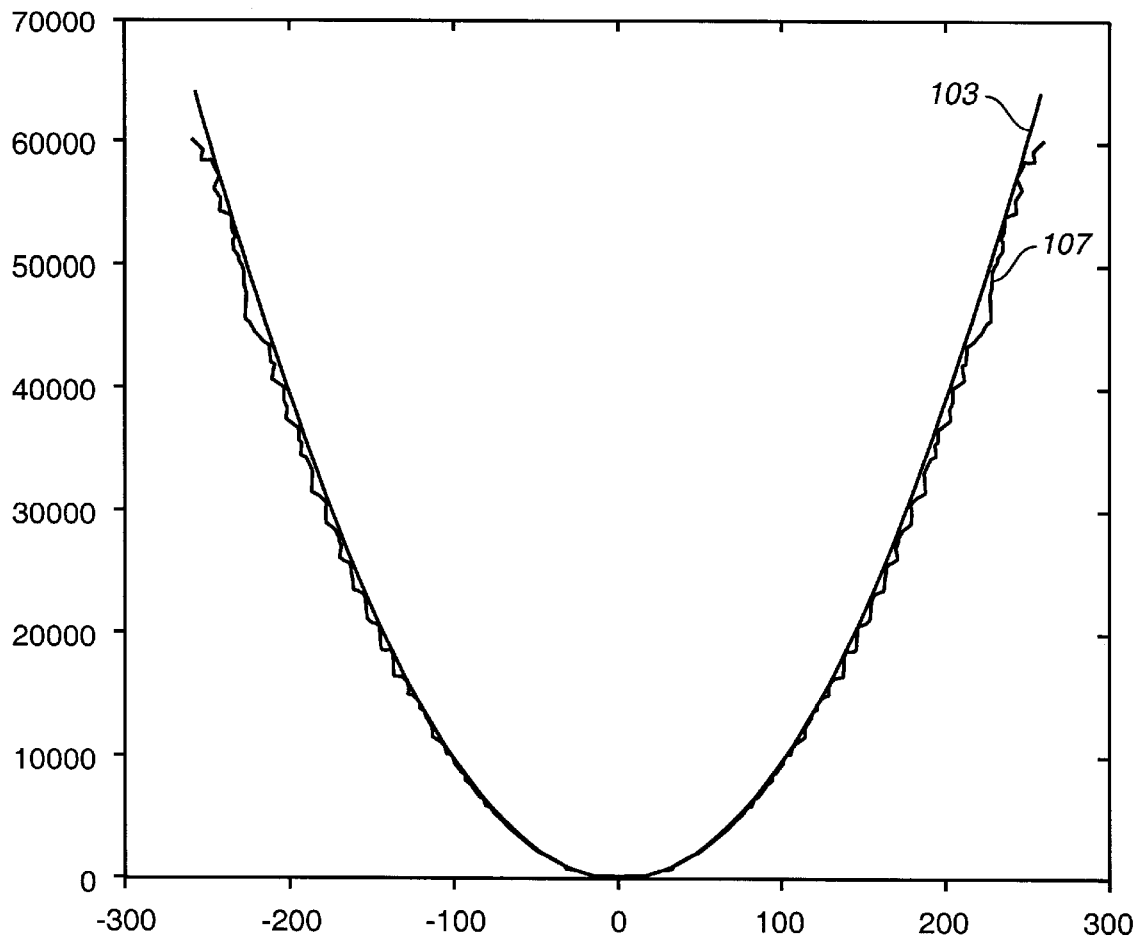
FIG._10

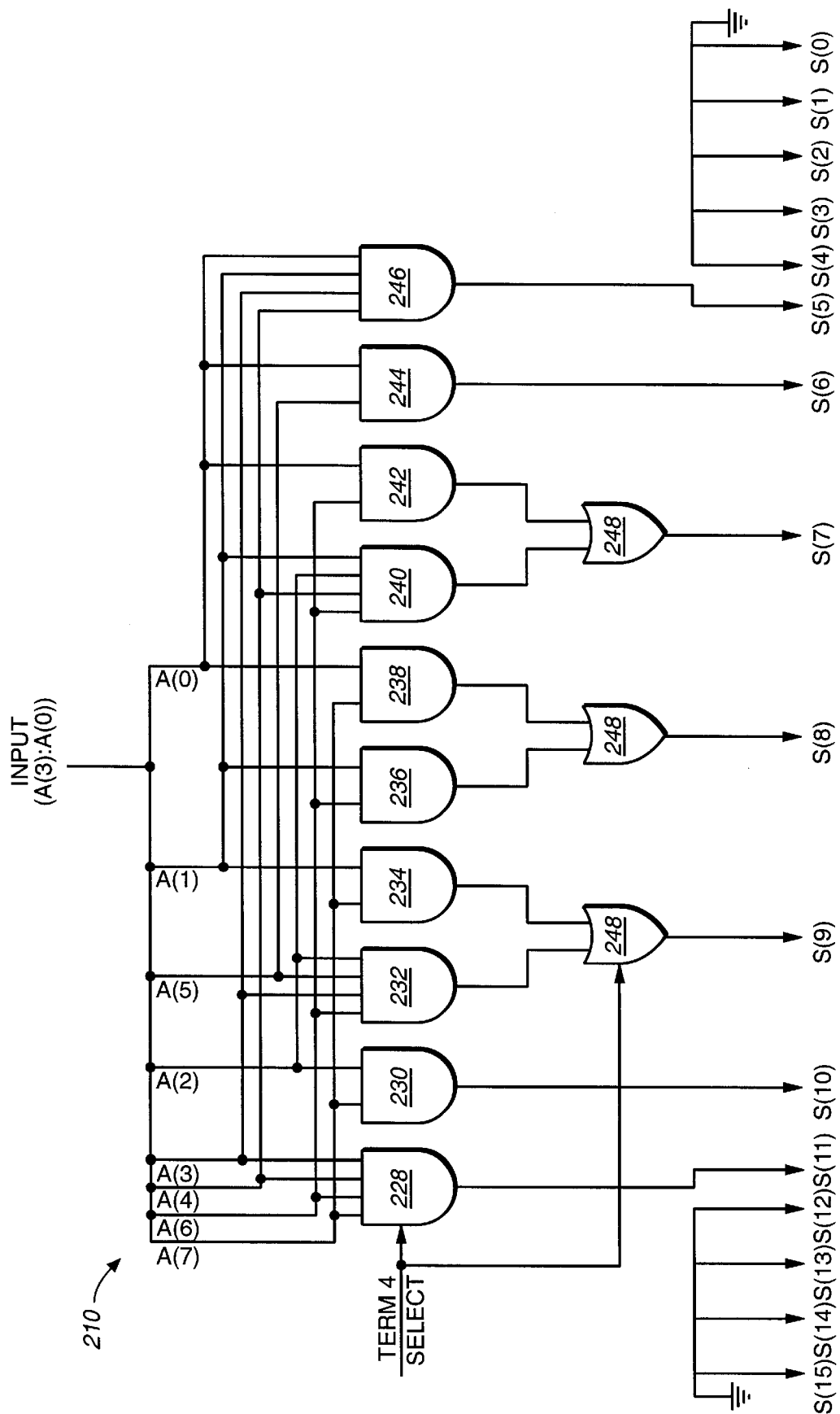
FIG._11

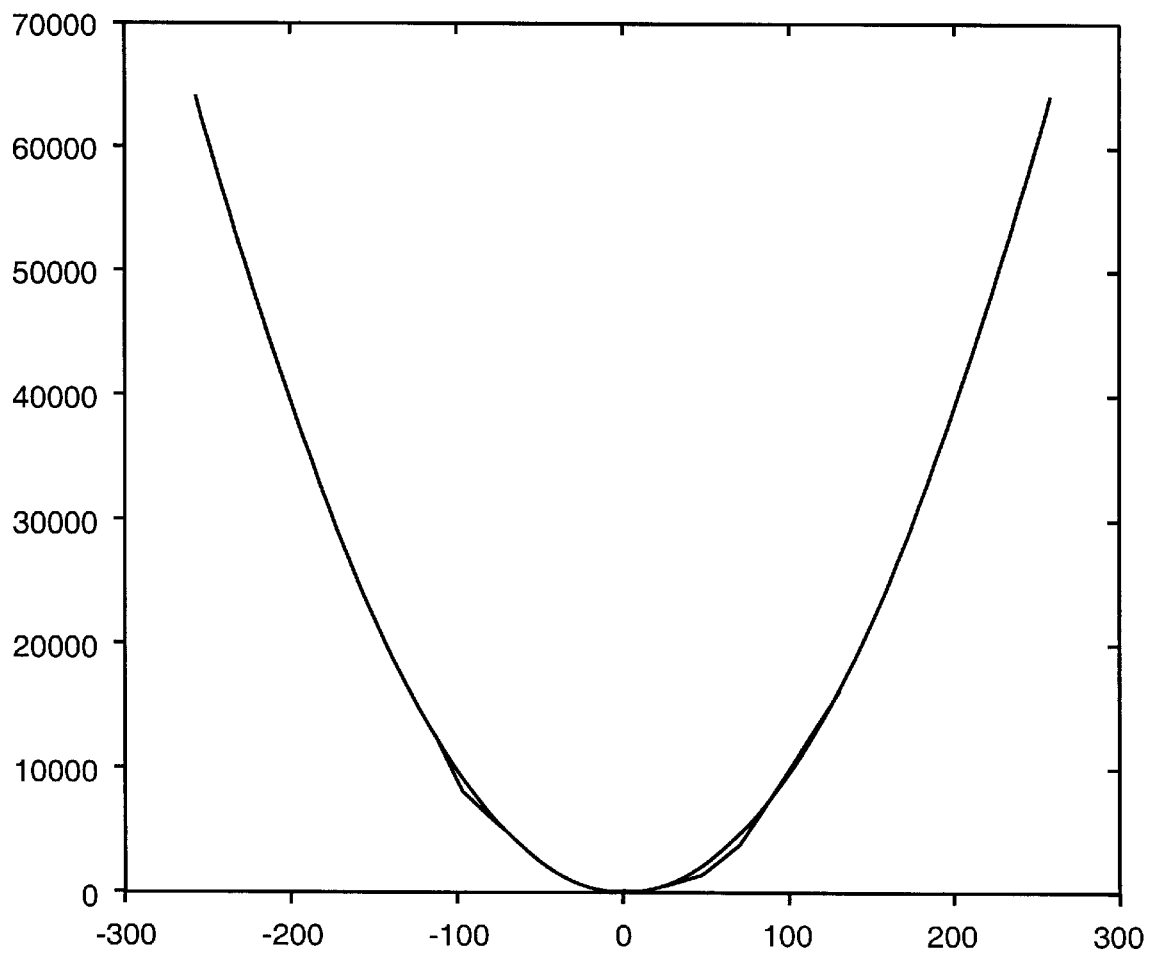
FIG._12

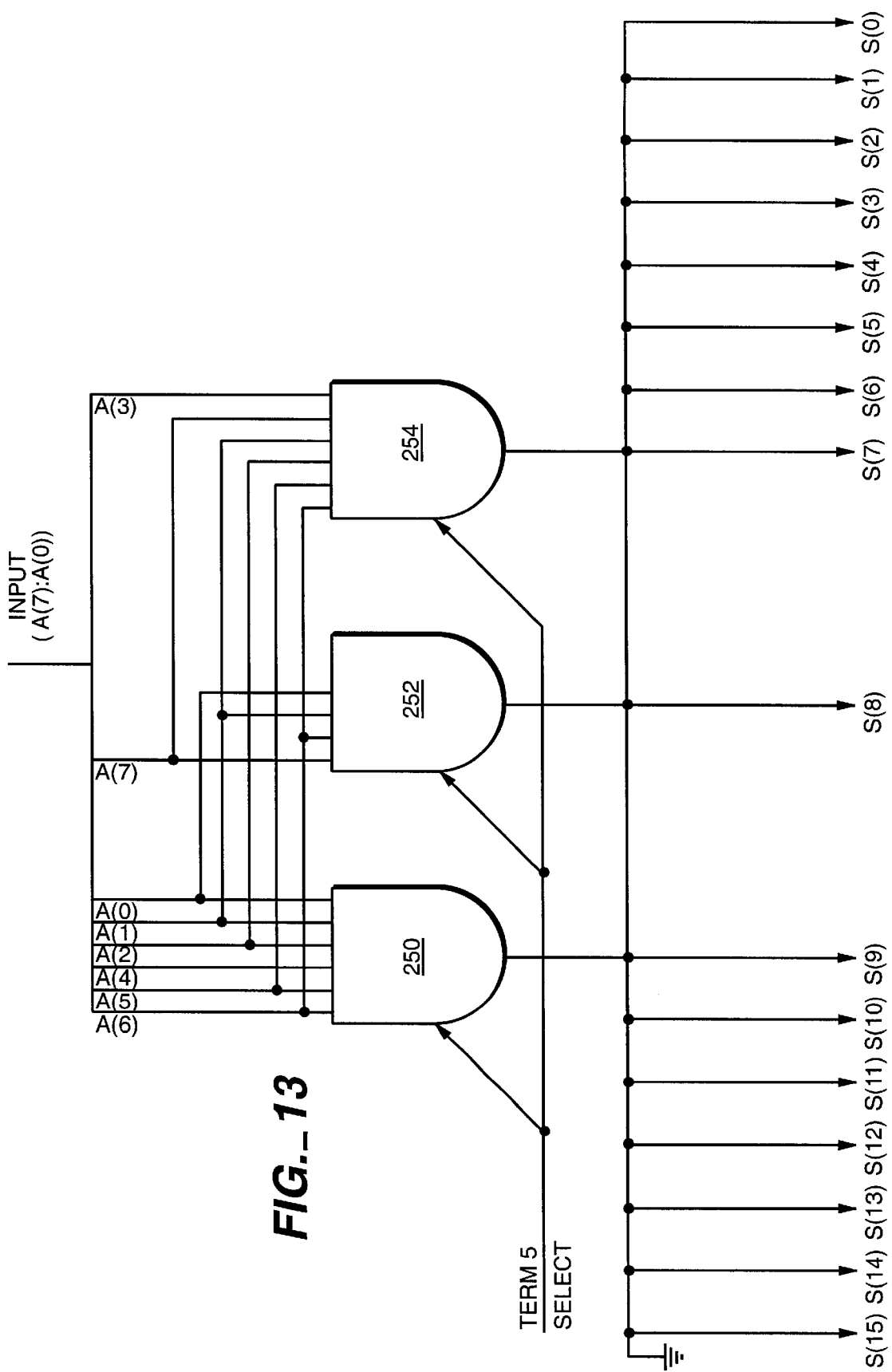
FIG._13

METHOD AND APPARATUS FOR ESTIMATING A SQUARE OF A NUMBER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a method for estimating a square of a number and more particularly to estimating the square of negative and positive integers. More particularly still, the invention relates to a flexible technique for estimating a square of an integer in accordance with a desired level of accuracy.

2. Background of the Invention

Many functions performed by digital processing systems such as personal computers and video systems require advanced mathematical calculations. For example, many video systems require the calculation of a "square" of a number. Squaring a number is the mathematical operation by which the number is multiplied by itself. The square of the number 10, for example, is represented as $10^2$ which equals 10×10 or 100.

Squaring a number is required or recommended for many applications such as for motion estimation in a video processing system. Motion estimation involves determining whether an object has moved from one video frame to the next. One technique for estimating motion involves calculating the sum of square differences between the object at its current location versus its location in a previous frame. That is, the differences between the values of the corresponding "pixels" comprising the image between frames is calculated and then squared. Finally, the squared values are added together and compared to a predetermined threshold value to determine if the object has moved.

Implementing a digital logic circuit to compute accurately a square typically requires a relatively large circuit. The size of a circuit can be measured in terms of "logic gates" or "cell units." A logic gate usually refers to a NAND gate logic unit which is a basic logic unit comprising many digital circuits. A NAND gate comprises one or more switching transistors. By combining NAND gates, and/or other types of logic gates, advanced digital circuits can be created for performing a variety of functions. A cell unit refers to a unit of surface area on an integrated circuit. A single logic gate generally requires approximately 3 cell units. The size of a digital circuit thus can be measured in terms of gates or cell units. This disclosure uses the cell unit to characterize the size of the circuits described herein.

Various techniques have been suggested for determining the square of a number. Some digital systems include a multiplier circuit which actually calculates the square of an input number. Multipliers, however, are undesirably large and expensive and consume a great deal of electrical power. A multiplier that can multiply two 9-bit integers, for example, requires 2,281 cell units for its implementation.

Alternatively, a table look-up method can be implemented for determining the square of a number. In this method, a table stored in memory includes the squares of a plurality of predefined numbers. The squares of the numbers, therefore, are predetermined and loaded into the table Thus, rather than actually calculating the square of a number, the square can be obtained directly from the table. If the square of a number is not stored in the table, the squares of the closest numbers can be used to estimate or calculate the desired result. Table look-up techniques generally require larger circuits for their implementation than multipliers. A table look-up implementation that includes look-ups for 512 squares requires approximately 4300 cell units.

Thus, a technique is needed for determining a square of a number that can be implemented with a smaller circuit and consume less power than previously possible. Despite the advantages offered by such a system, to date no such system is known to exist.

BRIEF SUMMARY OF THE INVENTION

The problems noted above are solved in large part by a square estimator that includes a square estimate term generator for producing at least one estimate term representative of an estimate of the input number and summing logic coupled to the square estimate term generator for adding together the estimate term from the square estimate term generator. Negative correction logic can also be provided to permit the square estimator to estimate the square of a negative number. If included, the negative correction logic is coupled to the square estimate term generator and the summing logic. The square estimate term generator produces an output estimate term that is added to a negative correction term generated by the negative correction logic. The resulting value from the summing logic represents an estimate of the square of the input number to the square estimator.

The level of accuracy in the estimate produced by the square estimator can be varied by varying the number of estimate terms produced by the square estimate term generator. Accordingly, the square estimate term generator can be configured to include one or more term generators. If a less accuracy is acceptable the square estimate term generator can be configured with only a single term generator. This single term generator produces an output estimate term that is based on input number to the square estimator. This term is then added by the summing logic to the negative correction term from the negative correction logic to produce the estimate of the square of the input number. If greater accuracy is desired, the square estimate term generator can be configured to include a second term generator which produces an estimate term that, when added to the first estimate term and the negative correction term, produces an estimate of the input number that is generally more accurate than the estimate generated without the second term generator. If further accuracy is desired, additional term generators can be included in the square estimate term generator.

Alternatively, the square estimate term generator can be constructed with enough term generators to achieve 100 percent accuracy over a desired range of input values. Each term generator included in the square estimate term generator can also be configured to accept a select signal that enables or disables the associated term generator. Thus, the square estimate term generator can be programmed by turning on and off various term generators to produce square estimates with varying degrees of accuracy.

The square estimator described herein permits an estimate of the square of an input number to be generated with any desired level of accuracy. Further, the estimate of the square of an input number can be performed generally using fewer logic gates then required for many other techniques for calculating the square of a number. These and other advantages will become apparent once the following disclosure and accompanying drawings are read.

BRIEF DESCRIPTION OF THE DRAWINGS

For a detailed description of the preferred embodiments of the invention, reference will now be made to the accompanying drawings in which:

FIG. 1 shows a system including square estimator logic for estimating the square of an integer in accordance with the preferred embodiment;

FIG. 2 shows one embodiment of the square estimator logic of FIG. 1;

FIG. 3 is a graph illustrating the accuracy level of the square estimator logic embodiment of FIG. 2;

FIG. 4 shows an alternative embodiment of the square estimator logic of FIG. 1;

FIG. 5 is a graph illustrating the accuracy level of the square estimator logic embodiment of FIG. 4;

FIG. 6 shows an alternative system level block diagram including negative processing logic and a square estimator term generator for estimating squares in accordance with the preferred embodiment;

FIG. 7 is a graph illustrating the accuracy level of the system of FIG. 6;

FIG. 8 shows a block diagram of the square estimator term generator of FIG. 6 as including generators for providing additional terms to improve the accuracy of the resulting estimated square;

FIG. 9 is a detailed schematic of a generator of FIG. 8 for generating an added term to improve accuracy;

FIG. 10 is a graph illustrating the accuracy of the system as in FIG. 6 implementing only the generator of FIG. 9;

FIG. 11 is a detailed schematic of a generator of FIG. 8 for generating an additional term to improve accuracy;

FIG. 12 is a graph illustrating the accuracy of the system as in FIG. 6 implementing only the generators of FIGS. 9 and 11;

FIG. 13 is a detailed schematic of a generator of FIG. 8 for generating another term to improve accuracy to 100 percent; and FIG. 14 is an exemplary embodiment of the negative processing logic of FIG. 6.

Certain terms are used throughout the following description and claims to refer to particular system components. Often, many companies in an industry refer to the same component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

The following preferred embodiments are based on the observation that often an exact determination of the square of a number is not required. For many applications, an approximation to the square of a number is sufficient. Further, some applications that use the square of a number require a different level of accuracy than other applications. The preferred embodiments described herein relate to techniques for estimating the square of an integer using circuits that are significantly smaller and consume less power than conventional methods for determining a square of a number. Further, the preferred embodiments permit the selection of a desired accuracy level, thereby permitting the user to trade-off accuracy versus power consumption and circuit size. The following description generally focuses on estimating the square of a 9-bit input number. It should be recognized, however, that the principles described herein can be extended to an input value having any number of bits.

Referring now to FIG. 1, square estimation system 100 constructed in accordance with the preferred embodiment generally comprises a square estimator 102. An input integer, $A(n)$, is provided to square estimator 102 and an output value, $Z(m)$, is generated by the square estimator. In accordance with the preferred embodiment of the invention, the output value $Z(m)$ represents an estimate or approximation of the input value. The output value may, but does not necessarily, represent the exact square of the input value.

Numerous implementations are possible for square estimator 102. FIG. 2, for example, shows one possible implementation of square estimator 102. In the example of FIG. 2 and all subsequent examples in this disclosure, the input value $A(n)$ is assumed to be a 9-bit integer, $A(8):A(0)$, which is a short-hand way to represent the bits $A(0)$, $A(1)$, $A(2)$, $A(3)$, $A(4)$, $A(5)$, $A(6)$, $A(7)$, and $A(8)$. $A(0)$ is the least significant bit (LSB) and $A(8)$ is the most significant bit (MSB). As an estimate of the square of $A(n)$, the output value $Z(m)$ will generally be a 16-bit value $Z(15):Z(0)$. In general, $A(n)$ can be any size integer. For sake of clarity, the following embodiments are described with n=9 so that $A(n)$ is a 9-bit value.

The embodiment of square estimator 102 shown in FIG. 2 produces the following output value:

$Z(0)=A(0)$ $Z(1)=0$ $Z(2)=A(1)$ $Z(3)=0$ $Z(4)=A(2)$ $Z(5)=0$ $Z(6)=A(3)$ $Z(7)=0$ $Z(8)=A(4)$ $Z(9)=0$ $Z(10)=A(5)$ $Z(11)=0$ $Z(12)=A(6)$ $Z(13)=0$ $Z(14)=A(7)$ $Z(15)=0$

This embodiment generally only estimates squares of positive integers (i.e., integers greater than or equal to zero).

Other embodiments described below estimate squares of positive and negative numbers.

The embodiment of FIG. 2 represents a low cost, low power implementation of a square estimator. Because no logic is required, the size of the circuit is 0 cell units. The accuracy of this embodiment, however, is lower than the other embodiments described below. Thus, the embodiment of FIG. 2 is particularly advantageous when less accuracy is needed. FIG. 3 includes a comparison curve 103 of the true square values for the input A(n) values ranging from −256 to +255. The result of applying the equations above result in line 105 which represents square estimates of A(n) in the range of A(n) values 0 to +255. As indicated, this embodiment is exactly accurate (100% accuracy) for the squares of A(n) values 0, 2, 4, 8, 16, 32, 64, and 128. The largest error by percentage is 66.41%. Further, the total number of errors in the range 0 to 255 is 247 and the average error percentage is 43.45%. This method may not be accurate enough for some applications, but may be accurate enough for other applications. Although this method may be adapted for use on negative input numbers, it is intended to operate on positive integers. The method is easy to implement at relatively low cost and requires no logic gates or other active (i.e., power consuming) circuitry.

Another embodiment of square generator 102 is shown in FIG. 4 and achieves better accuracy than the embodiment shown in FIG. 2. The embodiment of FIG. 4 includes logic gates 104, 106, 108, 110, and 112 (preferably implemented as AND gates) configured as shown for producing output bits Z(5), Z(7), Z(9), Z(11), and Z(13). As shown, the combinational logic circuit of FIG. 4 implements the following logic equations:

$Z(0)=A(0)$ $Z(1)=0$ $Z(2)=A(1)$ $Z(3)=0$ $Z(4)=A(2)$ $Z(5)=A(3) \text{ AND } A(2) \text{ AND } A(1) \text{ AND } A(0)$ $Z(6)=A(3)$ $Z(7)=A(4) \text{ AND } A(3) \text{ AND } A(2) \text{ AND } A(1)$ $Z(8)=A(4)$ $Z(9)=A(S) \text{ AND } A(4) \text{ AND } A(3) \text{ AND } A(2)$ $Z(10)=A(5)$ $Z(11)=A(6) \text{ AND } A(5) \text{ AND } A(4) \text{ AND } A(3)$ $Z(12)=A(6)$ $Z(13)=A(7) \text{ AND } A(6) \text{ AND } A(5) \text{ AND } A(4)$ $Z(14)=A(7)$ $Z(15)=0$ The preferred embodiments of the invention produce the least significant two bits of the resulting estimate (bits Z(1):Z(0)) as 0 and A(0), respectively, because the least significant two bits of the true square of an integer A(7):A(0) are in fact always 0 and A(0).

The embodiment of square estimator 102 in FIG. 4 requires more logic and thus more area in an integrated circuit (approximately 35 cell units) and requires more power. Although this embodiment is larger and consumes more power, it is more accurate than the embodiment of FIG. 2. The accuracy of the embodiment of FIG. 4 is shown graphically in FIG. 5 (true square function 103 versus estimate 107). Like the previous embodiment of FIG. 2, the embodiment of FIG. 4 is exactly accurate for integers 0, 2, 4, 8, 16, 32, 64, and 128, but is slightly more accurate for the other integers. The largest error by percentage is 62.15% with an average error percentage of 41.53%.

The alternative embodiments of square estimator 102 shown in FIGS. 2 and 4 are useful for estimating the square of positive integers, but generally not negative integers. To handle negative numbers, an alternative square estimator 200 of FIG. 6 includes a negative processing logic 202 that functions in conjunction with a square estimate term generator 204. Negative processing logic 202 includes a negative inversion unit 202(a) and a correction unit 202(b). An input integer A(n), either positive or negative, is provided to inversion unit 202(a) and correction unit 202(b) If the input integer A(n) is greater than or equal to 0 (i.e., positive), indicated by a most significant bit (MSB) of 0, the negative inversion unit 202(a) provides the A(n) input value to the square estimate term generator 204. If, however, A(n) is negative (i.e., A(n)<0), determined by A(n) having an MSB of 1, the negative inversion unit 202(a) computes and provides the value −A(n)−1 (the 1's complement, or bit-wise inversion of A(n)) to the term generator 204.

If desired for increased accuracy, the negative correction unit 202(b) generates a negative correction term identified as TERM 2 in FIG. 6. The TERM 2 negative correction term is also added to the one or more estimate terms from the square estimate term generator 204 to produce the output value Z(m) which represents an estimate of the square of the input value.

If the input integer A(n) is greater than or equal to zero (i.e., positive), the negative correction term (TERM 2) generated by the negative correction unit 202(b) is 0. If the input integer A(n) is negative (A(n)<0), the negative correction term, TERM 2, preferably is −2A(n)−1 or, alternatively stated, twice the 1's complement plus 1 (i.e., 2[−A(n)−1]+1). Multiplication by two can be implemented as a simple left shift operation. Adding one to a left shifted number preferably is implemented by making the least significant bit (LSB) of the shifted value a logic 1. For a 9-bit input value, the embodiment of the negative correction unit 202(b) shown in FIG. 6 generally requires approximately 426 cell units of surface area in an integrated circuit.

FIG. 14 illustrates an exemplary embodiment of negative processing logic 202. As shown, inversion unit 202(a) includes an exclusive OR gate array 260 and correction unit 202(b) includes an AND gate array 262. Exclusive OR gate array 260 exclusively OR's each of the least significant n−1 bits (i.e., all of the bits except for the MSB) with the MSB of the input value A(n). As such, exclusive OR gate array 260 functions as a bit-wise inverter when A(n) is a negative value (MSB=1). When A(n) is positive (MSB=0), the least significant n−1 bits are not changed by the exclusive OR operation. In either case, exclusive OR gate array 260 provides an unsigned, n−1 bit output value to term generator 204.

The AND gate array 262 of negative correction unit 202(b) logically AND's the MSB of A(n) with the output bits from exclusive OR gate array 260. The n−1 bits from exclusive OR gate array 260 preferably are coupled to bit positions n:1 (i.e., the upper n−1 bits of an n-bit value) to effectuate a multiply by 2 operation and the least significant bit is made a 1 to effectuate an addition by 1 operation. When the MSB of A(n) is 1, the n-bit output value from AND gate array 262 thus is 2[−A(n)−1]+1 as noted above. Logically AND'ing the AND gate array 262 input value from OR gate array 260 with the MSB simply serves as a way to make the AND gate array 262 output value 0 if A(n) is a positive number.

The negative correction unit 202(b) is based on the following principle. If the input integer A is less than 0, the 1's complement of A is computed by inverting the bits, and the result will be −A−1. The square of −A−1 is:

$$(-A-1)^2 = (A+1)^2 = A^2 + 2A + 1 \tag{1}$$

Thus, $A^2$ (where A is negative) can be estimated by estimating the square of the term −A−1 and then adding to that estimate the term −2A−1. In accordance with the preferred embodiment, the negative correction logic 202 preferably generates −A−1 by computing the 1's complement of the input integer when the input integer is a negative number. Accordingly, −A−1 is produced by negative correction logic 202 by inverting each bit of the negative input integer preferably using exclusive OR gates. The square estimator term generator 204 then generates one or more estimation terms (TERMS 1, 3–5) which, when added together by summer logic 220 estimate the square of (−A−1). Because square estimator 200 estimates $(-A-1)^2$, not the desired $(-A)^2$, a correction term must be added to the resulting estimate from the square estimate term generator 204 to produce a more accurate estimate of $A^2$. The correction term, TERM 2, preferably is 2(−A −1)+1.

If the input integer (A) is greater than or equal to 0, the input integer itself is provided to the square estimate term generator 204 for estimating the square. Because $A^2$ is estimated when the input integer is positive and not $(-A-1)^2$, a correction term generally is not required and thus TERM 2 can be set to 0.

The square estimate term generator 204 receives the output value from inversion unit 202(a) and in response generates one or more TERMS 1, 3, 4, 5. Preferably, TERM 1 is an estimate of the value provided as an input to the square estimate term generator 204. Additional terms (TERMS 2–5) can be provided, if desired, to achieve greater accuracy. Thus, each of the terms 2–5 are optional and preferably only those terms desired to achieve a desired minimum accuracy level are implemented. Alternatively, the logic to implement the terms 2–5 can be implemented with each term being individually enabled by asserting one or more of the selected lines TERM 3 SELECT, TERM 4 SELECT, TERM 5 SELECT as shown. Accordingly, the accuracy of the square estimator can be programmed if desired.

Any one of a variety of techniques can be implemented for TERM 1 generator 206 for generating TERM 1. For example, either of the techniques described above with respect to FIGS. 2 and 4 can be used to implement the TERM 1 generator. FIG. 7 illustrates the accuracy achieved if the technique shown in FIG. 4 is used to implement the TERM 1 generator 206 with TERM 3–5 generators disabled, but with negative correction logic 202 generating the negative correction term, TERM 2. As the comparison of the true square (trace 103) to square estimate trace 107 indicates the squares of both positive and negative integers can be estimated. Because the implementation of FIG. 4 was used as TERM 1 generator 206 to generate the accuracy trace 107 in FIG. 7, the resulting accuracy level is not appreciably different than that illustrated in FIG. 5, however, the squares of negative integers can also be estimated. It should be noted also that generating the bits of TERM 1 as shown in FIG. 4 uses a recursive formula, and can be extended beyond eight bits by simply repeating the pattern.

Referring now to FIG. 8, a block diagram of the square estimate term generator 204 is shown in accordance with the preferred embodiment to include a TERM 1 generator 206, and optional generators TERM 3 generator 208, TERM 4 generator 210, and TERM 5 generator 212. The input value to the square estimate term generator 204 is either the input integer A(n) for a positive A(n) value or −A(n)−1 for a negative A(n) value. FIGS. 9, 11, and 13 provide detailed schematics for possible embodiments of TERM generators 208, 210, and 212, respectively. FIGS. 10 and 12 graphically illustrate the accuracy of adding the additional TERMS 3 and 4 to the estimate term, TERM 1. Adding TERM 5 results in 100% percent accuracy throughout the full −256 to +255 input integer range and thus a graph showing its accuracy level is not needed. Preferably, accuracy of the estimate is increased as more terms are enabled.

Referring still to FIG. 8, the square estimate term generator 204 can be constructed with the logic necessary to implement all of the TERMs 1, 3, 4, and/or 5. The square estimate term generator, however, can be programmable to generate only desired certain terms. Through control logic (not shown), select lines TERM 1 SELECT, TERM 3 SELECT, TERM 4 SELECT, and TERM 5 SELECT can be provided if desired as input control signals to the square estimate term generator 204 to enable/disable the associated terms. Thus, if the TERM 1 SELECT control signal is activated, the square estimate term generator will generate TERM 1. The same is true with respect to TERM 3 SELECT, TERM 4 SELECT, and TERM 5 SELECT control signals enabling square estimate term generator 204 to generate TERMs 3–5 as desired. Accordingly, although the logic to generate TERMS 3–5 may be implemented in square estimate term generator 204, power can be saved if desired by disabling the generation of certain additional accuracy terms.

Preferably, however, the square estimate term generator 204 is constructed to provide logic only for those terms necessary to achieve a desired level of accuracy. Thus, rather than providing a square estimate term generator 204 that is programmable by asserting the desired term SELECT signals, the term generator 204 can be configured only to produce the desired terms (i.e., no programmability). By constructing the term generator only to produce the desired terms, the term generator 204 can be made smaller than if logic was included to generate all of the terms, TERMS 2–5.

TERM 2 can be implemented by negative correction unit 202(b) for increased accuracy. If even more accuracy is desired, square estimate term generator 204 can be configured to add additional terms, TERM 3, TERM 4, and/or TERM 5 to TERM 1 and optional TERM 2. In general, any number of additional accuracy improving terms can be added. For better accuracy, square estimate term generator 204 may generate TERM 3 to be added to TERMs 1 and 2 by summing logic 220. If even more accuracy is desired, square estimate term generator 204 may generate TERM 4 to be added to TERMs 1–3. If further improvement in accuracy is desired, square estimate term generator 204 may generate TERM 5 to be added to TERMs 1–4. The addition of each new term requires additional logic gates in square estimate term generator 204 thus taking up more surface area in an integrated circuit and requiring additional power.

By providing the ability to incrementally improve accuracy, square estimator 200 permits a user to make a trade-off between power and size versus accuracy. Thus, if a low power, small circuit is desired, albeit with lower accuracy, the square estimate term generator 204 can be configured only to generate TERM 1, not TERMs 3–5. On the other hand, if the highest level of accuracy is desired, square estimate term generator 204 can be configured to generate TERMs 1 and 3–5, albeit resulting in a larger circuit requiring higher power consumption. Other levels of accuracy, size and power consumption can be achieved by configuring the square estimate term generator 204 to generate just TERMs 1 and 3 or just terms 1, 3, and 4. TERM 2 is preferred to process negative numbers, but is not required.

Referring now to FIG. 9, TERM 3 generator 208 preferably comprises AND gates 222, exclusive OR gates 224 and OR gates 226 configured as shown to generate a 16 bit TERM 3 comprising output bits T3(15):T3(0). The TERM 3 bits (T3(15):T3(0)) are generated by the logic shown in FIG. 9 which preferably embodies the following logic equations, although other logic equations can be implemented as well:

$T3(0)=0$ $T3(1)=0$ $T3(2)=A(0)$ AND $A(1)$ $T3(3)=A(2)$ AND $A(0)$ $T3(4)=(A(2)$ AND $A(1))$ XOR $(A(3)$ AND $A(0))$ $T3(5)=(A(3)$ AND $A(1))$ OR $(A(4)$ AND $A(0))$ $T3(6)=(A(3)$ AND $A(2))$ XOR $(A(4)$ AND $A(1))$ $T3(7)=(A(4)$ AND $A(2))$ OR $(A(S)$ AND $A(1))$ $T3(8)=(A(4)$ AND $A(3))$ XOR $(A(5)$ AND $A(2))$ $T3(9)=(A(S)$ AND $A(3))$ OR $(A(6)$ AND $A(2))$ $T3(10)=(A(5)$ AND $A(4))$ XOR $(A(6)$ AND $A(3))$ $T3(11)=(A(6)$ AND $A(4))$ OR $(A(7)$ AND $A(3))$ $T3(12)=(A(6)$ AND $A(5))$ XOR $(A(7)$ AND $A(4))$ $T3(13)=A(7)$ AND $A(5)$ $T3(14)=A(7)$ AND $A(6)$ $T3(15)=0$

In these equations, as well as the equations used to generate TERMS 4–5, "A" represents the output value from negative correction unit 202(a) which may be A or −A−1 depending on whether the input value A(n) is positive or negative.

The implementation of TERM 3 generator 206 requires more logic and thus more area in an integrated circuit (approximately 841 cell units if TERM 1 generator 206 and negative correction logic 202 are also implemented), and requires more power than the previous embodiments for just TERMS 1 and 2. Although this embodiment is larger and consumes more power, it is more accurate than the previous embodiments. The accuracy of the square estimator 200 with additional TERM 3 is shown graphically in FIG. 10 (true square function 103 versus estimate 107). With TERMS 1, 2, and 3 added together by summing logic 220 to produce an estimate of the square of the input integer, the resulting square estimator 200 is exactly accurate for input integers in the range of −27 to +26. The total number of errors is 367 out of 512 possible values using a 9-bit input value and the largest error by percentage is 9.83% with an average error percentage of 3.83%.

If additional accuracy is desired, square estimate term generator 204 further can be configured to provide an additional term, TERM 4, the logic for which is shown in FIG. 11. The TERM 4 generator 210 preferably comprises AND gates 228, 230, 232, 234, 236, 238, 240, 242, 244 and 246 and OR gates 248 configured as shown. The TERM 4 bits (T4(15):T4(0)) are generated by the logic shown in FIG. 11 which preferably embodies the following logic equations although other logic equations can be implemented as well:

$T4(0)=0$ $T4(1)=0$ $T4(2)=0$ $T4(3)=0$ $T4(4)=0$ $T4(5)=A(4)$ AND $A(3)$ AND $A(1)$ AND $A(0)$ $T4(6)=A(5)$ AND $A(0)$ $T4(7)=(A(5)$ AND $A(4)$ AND $A(2)$ AND $A(1))$ OR $(A(6)$ AND $A(0))$ $T4(8)=(A(6)$ AND $A(1))$ OR $(A(7)$ AND $A(0))$ $T4(9)=(A(6)$ AND $A(5)$ AND $A(3)$ AND $A(2))$ OR $(A(7)$ AND $A(1)$ $T4(10)=A(7)$ AND $A(2)$ $T4(11)=A(7)$ AND $A(6)$ AND $A(4)$ AND $A(3)$ $T4(12)=0$ $T4(13)=0$ $T4(14)=0$ $T4(15)=0$

The implementation of TERM 4 generator 210 requires more logic and thus more area in an integrated circuit (approximately 1107 cell units when combined with negative correction logic 202 and TERM generators 206 and 208) and requires more power than the previous embodiments for TERMS 1, 2, and 3 only. Although this embodiment is larger and consumes more power, it is more accurate than the previous embodiments. The accuracy of the square estimator 200 with additional TERM 4 is shown graphically in FIG. 12, although the difference between the true square function and the estimate is difficult to discern graphically. With TERMS 1–4 added together by summing logic 220 to produce an estimate of the square of the input integer, the resulting square estimator 200 is exactly accurate for input integers in the range of −119 to +118. The total number of errors is 39 and the largest error by percentage is 1.38% with an average error percentage of 0.67%.

If even more accuracy is desired, square estimate term generator 204 can further be configured to provide additional term, TERM 5, the logic for which is shown in FIG. 13. TERM 5 generator 212 preferably comprises AND gates 250, 252, and 254 configured as shown. The TERM 5 bits (T5(15):T5(0)) are generated by the logic shown in FIG. 13 which preferably embodies the following logic equations, although other logic equations can be implemented as well:

$T5(0)=0$ $T5(1)=0$ $T5(2)=0$ $T5(3)=0$ $T5(4)=0$ $T5(5)=0$ $T5(6)=0$ $T5(7)=A(6) \text{ AND } A(5) \text{ AND } A(4) \text{ AND } A(2) \text{ AND } A(1) \text{ AND } A(0)$ $T5(8)=A(7) \text{ AND } A(6) \text{ AND } A(1) \text{ AND } A(0)$ $T5(9)=A(7) \text{ AND } A(6) \text{ AND } A(5) \text{ AND } A(3) \text{ AND } A(2) \text{ AND } A(1)$ $T5(10)=0$ $T5(11)=0$ $T5(12)=0$ $T5(13)=0$ $T5(14)=0$ $T5(15)=0$ The implementation of TERM 5 generator 212 requires more logic and thus more area in an integrated circuit (approximately 1288 cell units with all other term generators also implemented) and requires more power than the previous embodiment of square estimator 200 including logic for TERMS 1–4 only. Although this embodiment is larger and consumes more power, it is more accurate than the previous embodiments. With TERMS 1–5 added together by summing logic 220 to produce an estimate of the square of the input integer, the resulting square estimator 200 is exactly accurate for input integers in the range of −256 to +255 (i.e., 100% accurate over the input range).

In accordance with the preferred embodiment, each additional accuracy-improving term 2–5 is intended to provide an incremental improvement in accuracy over the square estimate 30 involving only previous terms. For example, TERM 3 is added to TERMs 1 and 2 by summing logic 220 to improve the accuracy of the estimate resulting from just TERMS 1 and 2. Similarly, TERM 4 is added to TERMs 1–3 by summing logic 220 to improve the accuracy of the estimate resulting from just TERMS 1–3. Finally, TERM 5 assumes that TERMS 1–3 are also generated and TERM 5 thus improves the accuracy of the estimate resulting from just TERMs 1–4. The embodiment of the square estimator to generate additional accuracy-improving terms to be added to other terms is preferred, but the claims may embrace other possibilities for combining and logically manipulating the bits of the input integer to estimate the square of the integer.

The above discussion is meant to be illustrative of the principles of the present invention. Numerous variations and modifications will become apparent to those skilled in the art once the above disclosure is fully appreciated. For example, the embodiments described above can also be implemented in software if desired. It is intended that the following claims be interpreted to embrace all such variations and modifications.

What is claimed is:

1. A square estimator for estimating the square of an input number, comprising:

a square estimate term generator for producing at least one estimate term representative of an estimate of the input number;

negative correction logic coupled to said square estimate term generator for generating a correction term to be added to said at least one estimate term to correct for input numbers that represent negative values; and a summing logic that adds together the correction term from the negative correction logic and the at least one estimate term from said square estimate term generator.

2. The square estimator of claim 1 wherein said square estimate term generator includes first and second term generators for generating first and second estimate terms to be added together by said summing logic to produce an estimate of the square of the input value.

3. The square estimator of claim 2 wherein each of said first and second term generators include an enable signal to individually disable or enable said term generator.

4. The square estimator of claim 1 wherein said square estimate term generator includes first, second and third term generators for generating first, second and third estimate terms to be added together by said summing logic to produce an estimate of the square of the input value.

5. The square estimator of claim 4 wherein each of said first, second, and third term generators include an enable signal to individually disable or enable said term generators.

6. The square estimator of claim 1 wherein said square estimate term generator includes first, second, third, and fourth term generators for generating first, second, third, and fourth estimate terms to be added together by said summing logic to produce an estimate of the square of the input value.

7. The square estimator of claim 6 wherein each of said first, second, third, and fourth term generators include an enable signal to individually disable or enable said term generators.

8. A square estimator for estimating the square of an input number, comprising:

a negative correction unit that produces a negative correction term to permit the square estimator to estimate the square of a negative input number and another value indicative of the input number;

a first term generator coupled to said negative correction unit;

a summing logic coupled to the negative correction unit and the first term generator, wherein said first term generator receives the value indicative of the input number from the negative correction unit and generates a first estimate term indicative of the square of the input number which is provided to the summing logic and wherein said summing logic combines the first estimate term with the negative correction term to produce an output value that represents an estimate of the square of the input number.

9. The square estimator of claim 8 wherein said negative correction unit produces a negative correction term that is substantially equal to twice the input number minus one if the input number is negative.

10. The square estimator of claim 9 wherein said negative correction unit produces a negative correction term that is substantially equal to 0 if the input number is 0 or positive.

11. The square estimator of claim 8 further including a third term generator which receives the value indicative of the input number from the negative correction unit, said third term generator generates a third estimate term which is added by said summing logic to the first estimate term and the negative correction term to produce an output value representative of an estimate of the square of the input value.

12. The square estimator of claim 11 wherein the average error percentage of the estimate is approximately 3.83 percent.

13. The square estimator of claim 11 wherein the estimate of the square is 100% accurate for input numbers in the range of about −27 to +26.

14. The square estimator of claim 11 wherein the first term generator includes combinational logic to implement the following logic equations:

$S(0)=A(0)$ $S(1)=0$ $S(2)=A(1)$ $S(3)=0$ $S(4)=A(2)$ $S(5)=A(3)$ and $A(2)$ and $A(1)$ and $A(0)$ $S(6)=A(3)$ $S(7)=A(4)$ and $A(3)$ and $A(2)$ and $A(1)$ $S(8)=A(4)$ $S(9)=A(9)$ and $A(4)$ and $A(3)$ and $A(2)$ $S(10)=A(5)$ $S(11)=A(6)$ and $A(5)$ and $A(4)$ and $A(3)$ $S(12)=A(6)$ $S(13)=A(7)$ and $A(6)$ and $A(5)$ and $A(4)$ $S(14)=A(7)$ $S(15)=0$ wherein S(m) is provided to the summing logic and A(n) is indicative of the input number.

15. The square estimator of claim 11 wherein third term generator includes combinational logic to implement the following logic equations:

$T3(0)=0$ $T3(1)=0$ $T3(2)=A(0)$ AND $A(1)$ $T3(3)=A(2)$ AND $A(0)$ $T3(4)=(A(2)$ AND $A(1))$ XOR $(A(3)$ AND $A(0))$ $T3(5)=(A(3)$ AND $A(1))$ OR $(A(4)$ AND $A(0))$ $T3(6)=(A(3)$ AND $A(2))$ XOR $(A(4)$ AND $A(1))$ $T3(7)=(A(4)$ AND $A(2))$ OR $(A(5)$ AND $A(1))$ $T3(8)=(A(4)$ AND $A(3))$ XOR $(A(5)$ AND $A(2))$ $T3(9)=(A(5)$ AND $A(3))$ OR $(A(6)$ AND $A(2))$ $T3(10)=(A(5)$ AND $A(4))$ XOR $(A(6)$ AND $A(3))$ $T3(11)=(A(6)$ AND $A(4))$ OR $(A(7)$ AND $A(3))$ $T3(12)=(A(6)$ AND $A(5))$ XOR $(A(7)$ AND $A(4))$ $T3(13)=A(7)$ AND $A(5)$ $T3(14)=A(7)$ AND $A(6)$ $T3(15)=0$ wherein T3(m) is provided to the summing logic and A(n) is representative of the input number.

16. The square estimator of claim 11 wherein the negative correction unit includes logic to produce the negative correction term as $2(A-1)+1$ wherein A represents the input number.

17. The square estimator of claim 11 further including a fourth term generator coupled to said negative correction unit and said summing logic and which received the value indicative of the input number from the negative correction unit, said fourth term generator generates a fourth estimate term which is added to by said summing logic to the first and third estimate terms and to the negative correction term to produce the estimate of the square of the input number.

18. The square estimator of claim 17 wherein the average error percentage of the estimate is approximately 0.67 percent.

19. The square estimator of claim 17 wherein the estimate of the square is 100% accurate for input numbers in the range of about −119 to +118.

20. The square estimator of claim 17 wherein the fourth term generator includes combinational logic to implement the following logic equations to produce the fourth estimate term S(m):

$T4(0)=S(1)=S(2)=S(3)=S(4)=S(12)=S(13)=S(14)=S(15)=0$ $T4(5)=A(4)$ AND $A(3)$ AND $A(1)$ AND $A(0)$ $T4(6)=A(5)$ AND $A(0)$ $T4(7)=(A(5)$ AND $A(4)$ AND $A(2)$ AND $A(11)$ OR $(A(6)$ AND $A(0))$ $T4(8)=(A(6)$ AND $A(1))$ OR $(A(7)$ AND $A(0))$ $T4(9)=(A(6)$ AND $A(5)$ AND $A(3)$ AND $A(2))$ OR $(A(7)$ AND $A(1))$ $T4(10)=A(7)$ AND $A(2)$ $T4(11)=A(7)$ AND $A(6)$ AND $A(4)$ AND $A(3)$ wherein A(n) is representative of the input number and T4(m) is provided to the summing logic.

21. The square estimator of claim 17 further including a fifth term generator coupled to said negative connection unit and said summing logic and which receives the value indicative of the input number from the negative correction unit, said fifth term generator generating a fifth estimate term which is added by said summing logic to said first, third and fourth estimate terms and said negative correction term to produce the estimate of the square of the input number.

22. The square estimator of claim 21 wherein the estimate is 100% accurate.

23. The square estimator of claim 22 wherein said fifth term generator includes combinational logic to implement the following logic equations to produce the fifth estimate term S(m):

$T5(0)=S(1)=S(2)=S(3)=S(4)=S(5)=S(6)=S(10)=S(11)=S(12)=S(13)=S(14)=S(15)=0$ $T5(7)=A(6)$ AND $A(5)$ AND $A(4)$ AND $A(2)$ AND $A(1)$ AND $A(0)$ $T5(8)=A(7)$ AND $A(6)$ AND $A(1)$ AND $A(0)$ $T5(9)=A(7)$ AND $A(6)$ AND $A(5)$ AND $A(3)$ AND $A(2)$ AND $A(1)$ wherein A(n) is representative of the input number and T5(m) is provided to the summing logic.

24. A digital system for computing an estimate of the square of an input integer, comprising:

a means for inverting the input integer;

a means for producing a negative correction term;

a first means coupled to said negative correction term means for producing a first estimate term;

a second means coupled to said negative correction term means for producing a third estimate term;

a summing means coupled to said negative correction means and said first and second means for adding together the negative correction term, the first estimate term, and the third estimate term to compute the estimate of the square of the input integer.

25. The digital system of claim 24 further including a third means coupled to said negative correction term means and said summing means for producing a fourth estimate term, said summing means adding together the negative correction term and the first, third, and fourth estimate terms.

26. The digital system of claim 25 further including a fourth means coupled to said negative correction term and said summing means for producing a fifth estimate term, said summing means adding together the negative correction term and the first, third, fourth and fifth estimate terms.

27. A method for estimating the square of a input number, comprising:

(a) generating a non-zero negative correction term if the input number is negative;

(b) calculating the one's complement of the input number;

(c) generating a plurality of estimate values bases on the one's complement of the input number; and (d) adding together the negative connection term and the plurality of estimate values.

28. The method of claim 27 wherein step (c) includes generating four estimate terms to achieve 100% accuracy within a range of input number values.

* * * * *